Figure 4:
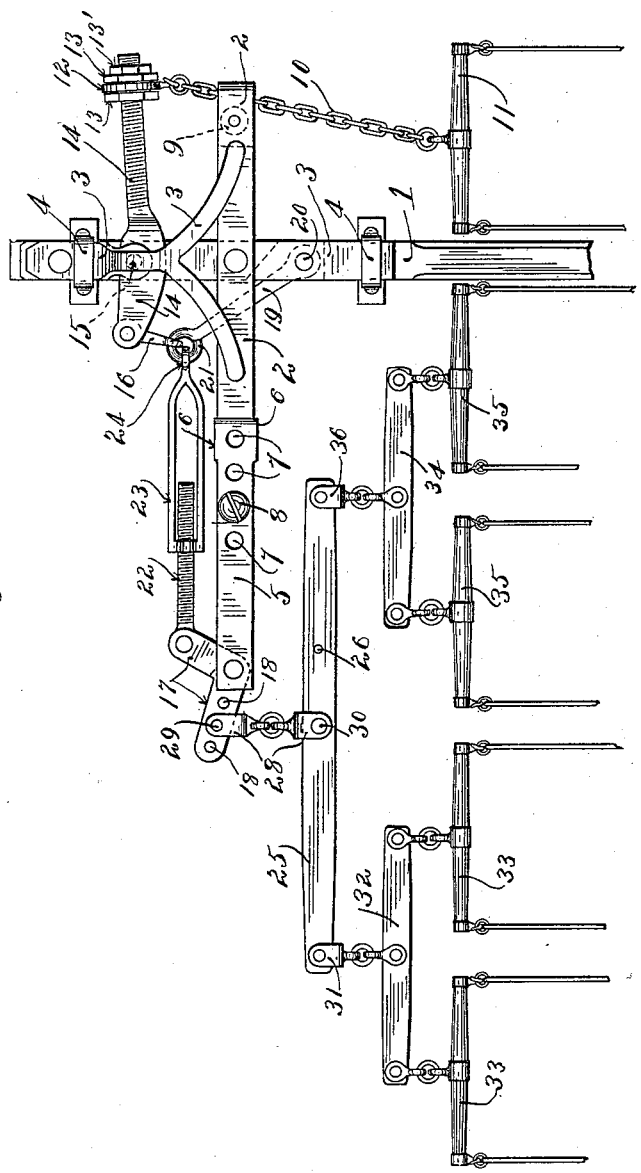

No. 662,198. Patented Nov. 20, 1900.
H. KUGLER.
DRAFT EQUALIZER.
(Application filed July 20, 1900.)
(No Model.) 2 Sheets—Sheet 1.
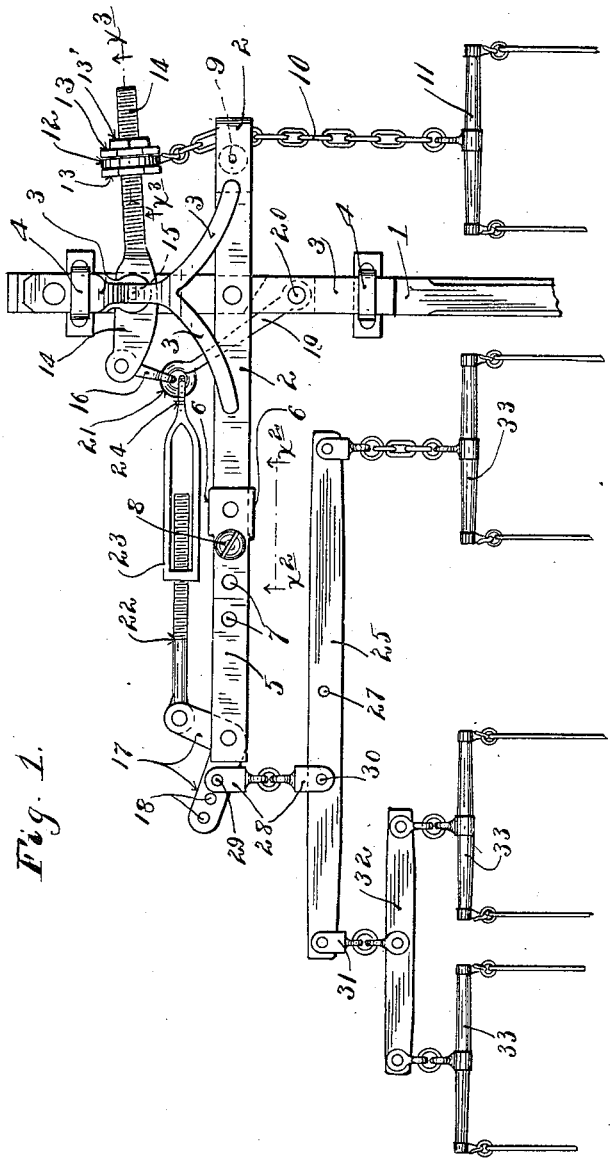
Witnesses.
Robert Otto.
Harry Kilgore.
Inventor.
Henry Kugler
By his Attorneys.
Williamson & Merchant No. 662,198. Patented Nov. 20, 1900.
H. KUGLER.
DRAFT EQUALIZER.
(Application filed July 20, 1900.)

(No Model.) 2 Sheets—Sheet 2.

Witnesses.
Robert Otto.
Harry Kilgore.

Inventor.
Henry Kugler.
By his Attorneys.
Williamson & Merchant

UNITED STATES PATENT OFFICE.

HENRY KUGLER, OF FERGUS FALLS, MINNESOTA.

DRAFT-EQUALIZER.

SPECIFICATION forming part of Letters Patent No. 662,198, dated November 20, 1900.

Application filed July 20, 1900. Serial No. 24,265. (No model.)

*To all whom it may concern:*

Be it known that I, HENRY KUGLER, a citizen of the United States, residing at Fergus Falls, in the county of Otter Tail and State of Minnesota, have invented certain new and useful Improvements in Draft-Equalizers; and I do hereby declare the following to be a full, clear, and exact description of the invention, such as will enable others skilled in the art to which it appertains to make and use the same.

My invention has for its object to provide an improved draft-evener, and has for its especial object to provide a convertible four and five horse evener of improved construction.

To the ends above indicated the invention consists of the novel devices and combinations of devices hereinafter described, and defined in the claims.

The invention is illustrated in the accompanying drawings, wherein like characters indicate like parts throughout the several views.

Figure 1 is a plan view illustrating my invention applied in working position and adjusted as a four-horse evener. Fig. 2 is a detail in front elevation from the vicinity of the line marked $x^2$ $x^2$ on Fig. 1. Fig. 3 is a section on the line $x^3$ $x^3$ of Fig. 1; and Fig. 4 is a view corresponding to Fig. 1, but showing the device adjusted as a five-horse evener.

The numeral 1 indicates the pole of the vehicle, the numeral 2 indicates a cross-bar rigidly connected to the pole 1 by a bracket 3 and clamps 4, and the numeral 5 indicates an extensible outer end section of the bar 2, the same, as shown, having flanges 6, embracing said bar, and having a series of perforations 7, through which and a suitable perforation in the said bar 2 a short nutted bolt 8 is passed to rigidly connect the said sections 2 and 5. The shorter end of the bar 2 is provided within a suitable passage with a guide-sheave 9, over which a chain 10 is run, the said chain being held from displacement by the said bar. At its forward end the chain 10 has a singletree 11, and at its rear end it is attached to a ring 12. The ring 12 is loosely mounted on a grooved collar 13, which works adjustably, by means of screw-threaded engagement, on the longer end of a lever 14, which is pivoted at 15 to the pole 1 and bracket 3, and is provided at its shorter end with a link 16.

Pivoted to the outer end of the bar extension 5 is a bell-crank lever 17, which, as shown, is provided in its outwardly-projecting arm with several perforations 18. A link 19, pivoted to the pole at 20, is provided at its free end with a large eye 21, which is pivotally connected to the forward end of a short link 16. The inner arm of the bell-crank 17 is connected to the eye 21 of the link 19 by an adjustable connection made up of a screw-rod 22 and a buckle or bracket 23, the latter of which has a hooked end 24, which detachably engages the said eye 21.

The numeral 25 indicates the bar of a convertible two or three horse evener, the same being provided with perforations 26 and 27. By means of a double-ended clevis 28 and pins 29 and 30 the bar 25 may be connected with the bell-crank lever 17, as shown in Fig. 1, and when so connected the said bar 25 acts as a three-horse evener. By means of another clevis 31 a two-horse evener 32, having singletrees 33, is attached to the shorter and outer end of the bar 25. When the parts are adjusted as shown in Fig. 1, the device, as already indicated, operates as a four-horse evener. In this arrangement it will be noted the nut or sleeve 13, to which the single-horse evener-chain 10 is connected by the ring 12, is screwed inward a considerable distance from the end of the lever 14.

13' is a lock-nut.

Under draft strains the one horse on the left-hand side of the pole draws on the chain 10 and the force is transmitted to the pole, the reaction or fulcrumage being taken by the toggle-lever made up by the parts 19, 22, and 23. On the other hand, the draft strains are transmitted from the three horses and react against the toggle-lever made up by the links 19 and 16. Thus it will be seen that the one horse on the one side of the pole and the three horses on the other side of the pole draw against each other, but that the one horse has approximately three times as great leverage as the three horses, so that their drawing strains are equalized.

By shifting the clevis 28 into the different holes 18 of the bell-crank lever 17 the leverage may be varied somewhat, so as to compensate for extremely small or extremely large draft-animals. The series of perforations 7 in the bar extension 5 permit the said bar to be extended or contracted, so as to bring the inner draft-animal the proper distance from the pole, and to compensate for these adjustments the buckle or bracket 23, being first disconnected from the eye 21 of the link 19, may be turned upon the rod 22, so as to correspondingly lengthen or contract that connection. It will also be understood that the leverage power given to the single draft-animal on the left-hand side of the pole may be greatly varied by adjusting the collar 13 on the screw-threaded end of the lever 14.

To transform the device into a five-horse evener, as shown in Fig. 4, the collar 13 is adjusted outward on the said lever 14, as shown in said Fig. 4. The clevis 28 is then connected to the central perforation 27 of the bar 25 and another two-horse evener 34 35 is connected to the inner end of said bar 25 by means of a clevis 36.

It will of course be understood that the construction above described is capable of considerable modification within the scope of my invention and that the principles of construction therein involved may be carried out in a three and four horse evener or in an evener for more than five horses.

What I claim, and desire to secure by Letters Patent of the United States, is as follows:

1. An equalizer involving as an intermediate connection between the single and the plural draft devices, the lever 14 pivoted at 15 and having the adjustable collar or head 13 to which the said single draft device is connected, substantially as described.

2. The combination with the pole having the transverse bar secured thereto, of the lever 14 pivoted to said pole and provided with the collar or head 13 having screw-threaded engagement therewith, the singletree and connection to said collar 13, the bell-crank lever 17 pivoted to the outer end of said pole-bar, a three-arm toggle-lever connecting the pole with said levers 14 and 17, and a draft-equalizer applied to said lever 17, substantially as described.

3. A convertible four and five horse evener, comprising in combination with the pole 1, the extensible bar 2 5 secured to said pole, the lever 14 pivoted to said pole and provided with the collar 13 screw-threaded thereon, the singletree 11 with chain 10 guided by said bar 2 and connected to said collar 13 by a ring 12, the bell-crank lever 17 pivoted to the bar extension 5, the toggle-lever 16, 19, 21, connecting the shorter end of the lever 14 with the pole, the adjustable connection 22, 23 connecting said lever 17 with the eye 21 of the toggle member 19, the convertible three and four horse evener-bar 25 adjustably connected to said bell-crank 17, and suitable draft devices for connection to said draft-bar 2 5, substantially as described.

In testimony whereof I affix my signature in presence of two witnesses.

HENRY KUGLER.

Witnesses:
J. S. SCRIBNER,
CHAS. C. HAUPT.